United States Patent
Rune et al.

(10) Patent No.: US 10,959,252 B2
(45) Date of Patent: *Mar. 23, 2021

(54) MULTI-CELL SIB PROVISION WITH ENCODING

(71) Applicant: Telefonaktiebolaget LM Ericsson (publ), Stockholm (SE)

(72) Inventors: Johan Rune, Lidingö (SE); Pål Frenger, Linköping (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 109 days.

This patent is subject to a terminal disclaimer.

(21) Appl. No.: 16/093,868

(22) PCT Filed: Sep. 12, 2018

(86) PCT No.: PCT/SE2018/050923
§ 371 (c)(1),
(2) Date: Oct. 15, 2018

(87) PCT Pub. No.: WO2019/066695
PCT Pub. Date: Apr. 4, 2019

(65) Prior Publication Data
US 2020/0084703 A1    Mar. 12, 2020

Related U.S. Application Data

(60) Provisional application No. 62/564,509, filed on Sep. 28, 2017.

(51) Int. Cl.
*H04W 72/12* (2009.01)
*H04L 1/00* (2006.01)
(Continued)

(52) U.S. Cl.
CPC ....... *H04W 72/1263* (2013.01); *H04L 1/0006* (2013.01); *H04W 28/06* (2013.01);
(Continued)

(58) Field of Classification Search
CPC ......... H04W 72/1263; H04W 72/1289; H04W 72/042; H04W 48/16; H04W 48/14;
(Continued)

(56) References Cited

U.S. PATENT DOCUMENTS 9,693,173 B2    6/2017   Vannithamby et al.
2015/0382284 A1* 12/2015  Brismar ............... H04W 28/085
                                                        370/329
(Continued)

FOREIGN PATENT DOCUMENTS

EP    2943015 A1 * 11/2015   ............ H04W 48/12

OTHER PUBLICATIONS

Ericsson, "System Information structure and contents", 3GPP TSG-RAN WG2 Ad Hoc on NR#2, Qingdao, China, Jun. 27, 2017, pp. 1-9, Tdoc R2-1706495, 3GPP.
(Continued)

*Primary Examiner* — Vinncelas Louis
(74) *Attorney, Agent, or Firm* — Coats & Bennett, PLLC

(57) ABSTRACT

A network node provisions multi-cell System Information (SI) for a serving cell serving a wireless device and some number of second cells by dividing the multi-cell System Information Block (SIB) into multiple SIB instances. At least one of the SIB instances comprises the SIB content for the serving cell, and each remaining SIB instance comprises the SIB content for the cell(s) associated with that SIB instance. In one embodiment, another of the SIB instances comprises SIB content for two or more of the second cells. In another embodiment, another of the SIB instances comprises SIB content for one or more of the second cells, which
(Continued)

is subsequently compressed before being provided to the wireless device. Each SIB instance is then provided to a wireless device via a corresponding downlink communication channel.

22 Claims, 6 Drawing Sheets

(51) Int. Cl.
| | |
|---|---|
| *H04W 28/06* | (2009.01) |
| *H04W 72/00* | (2009.01) |
| *H04W 48/10* | (2009.01) |
| *H04W 48/12* | (2009.01) |
| *H04W 48/14* | (2009.01) |
| *H04W 48/16* | (2009.01) |
| *H04W 72/04* | (2009.01) |

(52) U.S. Cl.
CPC ........... *H04W 48/10* (2013.01); *H04W 48/12* (2013.01); *H04W 48/14* (2013.01); *H04W 48/16* (2013.01); *H04W 72/005* (2013.01); *H04W 72/042* (2013.01); *H04W 72/1289* (2013.01)

(58) Field of Classification Search
CPC ... H04W 48/12; H04W 48/10; H04W 72/005; H04W 28/06; H04W 68/00; H04W 48/20; H04W 28/085; H04L 1/0006; H04L 43/16
See application file for complete search history.

(56) References Cited

U.S. PATENT DOCUMENTS

2016/0150506 A1* 5/2016 Tabet ..................... H04W 48/20
370/329
2017/0099670 A1* 4/2017 Bhattacharya .......... H04L 43/16
2019/0268830 A1* 8/2019 Kim ....................... H04W 68/00

OTHER PUBLICATIONS

Ericsson, "Encoding of broadcasted system information", 3GPP TSG-RAN WG2 #98, Hangzhou, P.R. of China, May 15, 2017, pp. 1-4, Tdoc R2-1704389, 3GPP.

CMCC, "Further considerations on other SI", 3GPP TSG-RAN WG2 NR Ad Hoc, Spokane, USA, Jan. 17, 2017, pp. 1-6, R21700529, 3GPP.

Ericsson, "Stored system information", 3GPP TSG-RAN WG2#99bis, Prague, Czech Republic, Oct. 9, 2017, pp. 1-15, R2-1710385, 3GPP.

* cited by examiner

MULTI-CELL SIB PROVISION WITH ENCODING

This application claims the benefit of U.S. Provisional Application Ser. No. 62/564,509 filed 28 Sep. 2017; the disclosures of which is incorporated herein by reference in their entirety.

TECHNICAL FIELD

The solution(s) presented herein generally relate to System Information (SI) for one or more cells of a network, and more particularly relate to the provisioning of such SI for a serving cell and two or more second cells within an SI area of the serving cell.

BACKGROUND

The use of high carrier frequencies, e.g., 6-100 GHz has become increasingly important in modern wireless communications, and has become particularly important for the upcoming 5th Generation (5G) systems. For such high frequencies; the atmospheric, penetration, and diffraction attenuation properties can be much worse than for lower frequencies. In addition, the receiver antenna aperture (a metric used to describe the effective receiver antenna area that collects the electromagnetic energy from an incoming electromagnetic wave) is inversely proportional to the frequency. As such, for high carrier frequencies, the link budget would be worse than for lower frequencies for the same link distance, even in a free space scenario, if omnidirectional receive and transmit antennas are used. Beamforming may be used to compensate for the loss of link budget in such high frequency systems, which is particularly important when communicating with User Equipments (UEs) with poor receivers, e.g., low cost/low complexity UEs. Other means for improving the link budget include, but are not limited to, repetition of the transmissions, e.g., to allow wide beam or omnidirectional transmissions, or the use of Single Frequency Network (SFN) transmissions from multiple Transmission/Reception Points (TRPs) in the same or different cells.

For the 5G system currently being standardized by the 3rd Generation Partnership Project (3GPP), where the radio access network is referred to as New Radio (NR) and the core network is referred to as Next Generation Core (NGC), 3GPP has agreed to partly change the principles for distribution of System Information (SI) that are used in LIE, For NR, it has been decided to divide the SI into "minimum SI" and "other SI," where the minimum SI comprises the SI required to access the cell. It will be appreciated that the minimum SI comprises at least two parts: the SI needed for accessing the serving cell; e.g.; NR-MIB transmitted on the PBCH as part of the SS block and the RMSI included in SIB1. The minimum SI is periodically broadcast in a cell, while the other SI may be either periodically broadcast or delivered on demand.

The 3GPP agreements also include that the SI provided in a cell may include SI valid in other cells than the cell in which the SI is provided, e.g., cells belonging to a certain area, referred to herein as an SI area. Such an SI area may be identified by an SI area ID, which may be periodically broadcast in the minimum SI of the cells belonging to the SI area. The multi-cell SI may include a certain SI parameter value valid in multiple cells, and/or multiple values for the same SI parameter, each being valid in a different cell. In addition, there may be optional SI parameters that are present in the SI of some of the cells but not in others. Thus, provisioning SI for multiple cells may require an excessive amount of data to be conveyed within the cell.

Thus, there is a need for the efficient provisioning of multi-cell SI within a cell.

SUMMARY

The solution presented herein provisions multi-cell System Information (SI) for a serving cell serving a wireless device and some number of second cells by dividing the multi-cell System Information Block (SIB) into multiple SIB instances, where at least one of the SIB instances comprises SIB content for the serving cell. Each SIB instance is then provided to a wireless device via a corresponding downlink communication channel. In one embodiment, another of the SIB instances comprises SIB content for two or more of the second cells. In another embodiment, another of the SIB instances comprises SIB content for one or more of the second cells, which is subsequently compressed before being provided to the wireless device.

One exemplary embodiment comprises a method, implemented by a network node of a serving cell, of provisioning system information for the serving cell and two or more second cells within a System Information (SI) area of the serving cell, where the network node is configured to transmit downlink signals to a wireless device in the serving cell and to receive uplink signals from the wireless device. The method comprises dividing multi-cell content of a System Information Block (SIB) into a first SIB instance comprising SIB content for the serving cell and a second SIB instance comprising SIB content for two or more of the second cells. The method further comprises providing the first SIB instance to the wireless device via a first downlink communication channel, and providing the second SIB instance to the wireless device via a second downlink communication channel.

In one exemplary method, the method further comprises compressing the SIB content comprised within at least one of the first and second SIB instances to generate at least one of a compressed first SIB instance and a compressed second SIB instance, wherein providing the first and second SIB instances to the wireless device comprises providing each of the compressed SIB instances to the wireless device via the corresponding downlink channel. For example, providing each of the compressed SIB instances to the wireless device comprises providing the first SIB instance to the wireless device via the first downlink communication channel and providing the compressed second SIB instance to the wireless device via the second downlink communication channel, or providing the compressed first SIB instance to the wireless device via the first downlink communication channel and providing the (not compressed) second SIB instance to the wireless device via the second downlink communication channel, or providing the compressed first SIB instance to the wireless device via the first downlink communication channel and providing the compressed second SIB instance to the wireless device via the second downlink communication channel.

In one exemplary method, compressing the SIB content comprises compressing the SIB content comprised within the second SIB instance relative to the SIB content comprised within the first SIB instance to generate the compressed second SIB instance.

In one exemplary method, compressing the SIB content comprised within the second SIB instance comprises including, in the compressed second SIB instance, only the SIB content in the second SIB instance that differs from the SIB content in the first SIB instance.

In one exemplary method, compressing the SIB content comprised within the second SIB instance comprises generating the compressed second SIB instance by encoding each of any first parameters of the second SIB instance with a first format, said first parameters comprising those parameters in the second SIB instance that are identical to a corresponding parameter in the first SIB instance, and encoding each of any second parameters of the second SIB instance with a second format different from the first format, said second parameters comprising those parameters in the second SIB instance that are different than the corresponding parameter in the first SIB instance.

In one exemplary method, the first format comprises a single bit, and the second format comprises a toggled version of the single bit in addition to the corresponding parameter.

In one exemplary method, the first format comprises a single bit, and the second format comprises a toggled version of the single bit in addition to a difference between the corresponding parameters in the first and second SIB instances.

In one exemplary method, the method further comprises including a compression indicator in at least one of the first and second SIB instances, the compression indicator indicating whether at least one of the first and second SIB instances comprises compressed system information.

In one exemplary method, including the compression indicator comprises including the compression indicator in a scheduling information element.

In one exemplary method, the compression indicator further indicates the type of compression used to generate the compressed system information.

In one exemplary method, at least one of the first and second downlink communication channels comprises a downlink broadcast channel, and providing the first and second SIB instances comprises periodically broadcasting at least one of the first and second SIB instances in the serving cell via the corresponding downlink broadcast channel.

In one exemplary method, the method further comprises receiving a system information request from the wireless device, wherein providing the first and second SIB instances comprises providing, via the corresponding downlink communication channel, at least one of the first and second SIB instances to the wireless device responsive to the received system information request.

In one exemplary method, providing the first and second SIB instances comprises periodically broadcasting the first SIB instance via the first downlink communication channel, said first downlink communication channel comprising a downlink broadcast channel, and providing the second SIB instance via the second downlink communication channel responsive to a system information request received from the wireless device.

In one exemplary method, dividing the multi-cell content of the SIB comprises dividing the multi-cell content of the SIB into the first SIB instance comprising SIB content for the serving cell, the second SIB instance comprising SIB content for a first grouping of second cells comprising two or more of the second cells, and a third SIB instance comprising SIB content for a second grouping of second cells comprising one or more of the second cells not in the first grouping of second cells, wherein the method further comprises providing the third SIB instance to the wireless device via a third downlink communication channel.

In one exemplary method, the second and third downlink communication channels comprise the same downlink communication channel.

In one exemplary method, the first grouping of second cells comprises two or more of the second cells that do not neighbor the serving cell, and the second grouping of second cells comprises one or more of the second cells that neighbor the serving cell.

In one exemplary method, the first grouping of second cells comprises two or more of the second cells that neighbor the serving cell, and the second grouping of second cells comprises one or more of the second cells that do not neighbor the serving cell.

In one exemplary method, the method further comprises compressing the SIB content comprised within at least one of the first, second, and third SIB instances to generate at least one of a compressed first SIB instance, a compressed second SIB instance, and a compressed third SIB instance, wherein providing the first, second, and third SIB instances to the wireless device comprises providing each of the compressed instances to the wireless device via the corresponding downlink channel. For example, providing each of the compressed SIB instances to the wireless device comprises:

providing the compressed first SIB instance to the wireless device via the first downlink communication channel, providing the (not compressed) second SIB instance to the wireless device via the second downlink communication channel, and providing the (not compressed) third SIB instance to the wireless device via the third downlink communication channel; or providing the (not compressed) first SIB instance to the wireless device via the first downlink communication channel, providing the compressed second SIB instance to the wireless device via the second downlink communication channel, and providing the (not compressed) third SIB instance to the wireless device via the third downlink communication channel; or providing the (not compressed) first SIB instance to the wireless device via the first downlink communication channel, providing the (not compressed) second SIB instance to the wireless device via the second downlink communication channel, and providing the compressed third SIB instance to the wireless device via the third downlink communication channel; or providing the compressed first SIB instance to the wireless device via the first downlink communication channel, providing the compressed second SIB instance to the wireless device via the second downlink communication channel, and providing the (not compressed) third SIB instance to the wireless device via the third downlink communication channel; or providing the compressed first SIB instance to the wireless device via the first downlink communication channel, providing the (not compressed) second SIB instance to the wireless device via the second downlink communication channel, and providing the compressed third SIB instance to the wireless device via the third downlink communication channel; or providing the (not compressed) first SIB instance to the wireless device via the first downlink communication channel, providing the compressed second SIB instance to the wireless device via the second downlink communication channel, and providing the compressed third SIB instance to the wireless device via the third downlink communication channel; or providing the compressed first SIB instance to the wireless device via the first downlink communication channel, providing the compressed second SIB instance to the wireless device via the second downlink communication channel, and providing the compressed third SIB instance to the wireless device via the third downlink communication channel.

In one exemplary method, the multi-cell content comprises the SIB content for all of the cells within the SI area.

One exemplary embodiment comprises computer program product for controlling a network node of a serving cell to provision system information for the serving cell and two or more second cells within a System Information (SI) area of the serving cell, where the network node is configured to transmit downlink signals to a wireless device and to receive uplink signals from the wireless device. The computer program product comprises software instructions which, when run on at least one processing circuit in the network node, causes the network node to divide multi-cell content of a System Information Block (SIB) into a first SIB instance comprising SIB content for the serving cell and a second SIB instance comprising SIB content for two or more of the second cells. The computer program product comprises software instructions which, when run on at least one processing circuit in the network node, further causes the network node to provide the first SIB instance to the wireless device via a first downlink communication channel, and to provide the second SIB instance to the wireless device via a second downlink communication channel.

In one exemplary embodiment, a computer-readable medium comprises the computer program product.

In one exemplary embodiment, the computer-readable medium comprises a non-transitory computer readable medium.

One exemplary embodiment comprises a network node of a serving cell for transmitting downlink signals to a wireless device in the serving cell and receiving uplink signals from the wireless device. The network node is configured to provision system information for the serving cell and two or more second cells within a System Information (SI) area of the serving cell. The network node comprises a System Information Block (SIB) circuit/module/unit and a transmitter circuit/module/unit. The SIB circuit/module/unit is configured to divide multi-cell content of a SIB into a first SIB instance comprising SIB content for the serving cell and a second SIB instance comprising SIB content for two or more of the second cells. The transmitter circuit/module/unit is configured to provide the first SIB instance to the wireless device via a first downlink communication channel, and provide the second SIB instance to the wireless device via a second downlink communication channel.

In one exemplary network node, the network node further comprises a compression circuit configured to compress the SIB content comprised within at least one of the first and second SIB instances to generate at least one of a compressed first SIB instance and a compressed second SIB instance, wherein the transmitter provides the first and second SIB instances to the wireless device by providing each of the compressed SIB instances to the wireless device via the corresponding downlink channel.

In one exemplary network node, the compression circuit compresses the SIB content by compressing the SIB content comprised within the second SIB instance relative to the SIB content comprised within the first SIB instance to generate the compressed second SIB instance.

In one exemplary network node, the compression circuit compresses the SIB content comprised within the second SIB instance by including, in the compressed second SIB instance, only the SIB content in the second SIB instance that differs from the SIB content in the first SIB instance.

In one exemplary network node, the compression circuit compresses the SIB content comprised within the second SIB instance by generating the compressed second SIB instance by encoding each of any first parameters of the second SIB instance with a first format, said first parameters comprising those parameters in the second SIB instance that are identical to a corresponding parameter in the first SIB instance, and encoding each of any second parameters of the second SIB instance with a second format different from the first format, said second parameters comprising those parameters in the second SIB instance that are different than the corresponding parameter in the first SIB instance.

In one exemplary network node, the first format comprises a single bit, and the second format comprises a toggled version of the single bit in addition to the corresponding parameter. In one exemplary network node, the first format comprises a single bit set, and the second format comprises a toggled version of the single bit in addition to a difference between the corresponding parameters in the first and second SIB instances.

In one exemplary network node, the SIB circuit is further configured to include a compression indicator in at least one of the first and second SIB instances, the compression indicator indicating whether at least one of the first and second SIB instances comprises compressed system information.

In one exemplary network node, the SIB circuit includes the compression indicator by including the compression indicator in a scheduling information element.

In one exemplary network node, the compression indicator further indicates the type of compression used to generate the compressed system information.

In one exemplary network node, at least one of the first and second downlink communication channels comprises a downlink broadcast channel, and the transmitter provides the first and second SIB instances by periodically broadcasting at least one of the first and second SIB instances in the serving cell via the corresponding downlink broadcast channel. In one exemplary network node, the network node further comprises a receiver configured to receive a system information request from the wireless device, wherein the transmitter provides the first and second SIB instances by providing, via the corresponding downlink communication channel, at least one of the first and second SIB instances to the wireless device responsive to the received system information request.

In one exemplary network node, the transmitter provides the first and second SIB instances by periodically broadcasting the first SIB instance via the first downlink communication channel, said first downlink communication channel comprising a downlink broadcast channel, and providing the second SIB instance via the second downlink communication channel responsive to a system information request received from the wireless device.

In one exemplary network node, the SIB circuit divides the multi-cell content of the SIB by dividing the multi-cell content of the SIB into the first SIB instance comprising the SIB content for the serving cell, the second SIB instance comprising SIB content for a first grouping of second cells comprising two or more of the second cells, and a third SIB instance comprising SIB content for a second grouping of second cells comprising one or more of the second cells not in the first grouping of second cells, wherein the transmitter is further configured to provide the third SIB instance to the wireless device via a third downlink communication channel.

In one exemplary network node, the second and third downlink communication channels comprise the same downlink communication channel.

In one exemplary network node, the first grouping of second cells comprises two or more of the second cells that do not neighbor the serving cell, and the second grouping of second cells comprises one or more of the second cells that neighbor the serving cell.

In one exemplary network node, the first grouping of second cells comprises two or more of the second cells that neighbor the serving cell, and the second grouping of second cells comprises one or more of the second cells that do not neighbor the serving cell.

In one exemplary network node, the network node further comprises a compression circuit configured to compress the SIB content comprised within at least one of the first, second, and third SIB instances to generate at least one of a compressed first SIB instance, a compressed second SIB instance, and a compressed third SIB instance, wherein the transmitter provides the first, second, and third SIB instances to the wireless device by providing each of the compressed instances to the wireless device via the corresponding downlink channel.

In one exemplary network node, the multi-cell content comprises the SIB content for all of the cells within the SI area.

One exemplary embodiment comprises a network node of a serving cell for transmitting downlink signals to a wireless device and receiving uplink signals from the wireless device. The network node is configured to provision system information for the serving cell and two or more second cells within a System Information (SI) area of the serving cell, the network node comprising a memory circuit and one or more processing circuits. The memory circuit contains instructions executable by said one or more processing circuits to configure the network node to divide multi-cell content of a SIB into a first SIB instance comprising SIB content for the serving cell and a second SIB instance comprising SIB content for two or more of the second cells, provide the first SIB instance to the wireless device via a first downlink communication channel, and provide the second SIB instance to the wireless device via a second downlink communication channel.

One exemplary embodiment comprises a network node of a serving cell for transmitting downlink signals to a wireless device and receiving uplink signals from the wireless device (200), the network node configured to provision system information for the serving cell and two or more second cells within a System Information (SI) area of the serving cell. The network node is configured to divide multi-cell content of a SIB into a first SIB instance comprising SIB content for the serving cell and a second SIB instance comprising SIB content for two or more of the second cells, provide the first SIB instance to the wireless device via a first downlink communication channel, and provide the second SIB instance to the wireless device via a second downlink communication channel.

In one exemplary network node, the network node is further configured to compress the SIB content comprised within at least one of the first and second SIB instances to generate at least one of a compressed first SIB instance and a compressed second SIB instance, and the network node provides the first and second SIB instances to the wireless device by providing each of the compressed SIB instances to the wireless device via the corresponding downlink channel.

In one exemplary network node, the network node compresses the SIB content by compressing the SIB content comprised within the second SIB instance relative to the SIB content comprised within the first SIB instance to generate the compressed second SIB instance.

In one exemplary network node, network node compresses the SIB content comprised within the second SIB instance by including, in the compressed second SIB instance, only the SIB content in the second SIB instance that differs from the SIB content in the first SIB instance.

In one exemplary network node, the network node compresses the SIB content comprised within the second SIB instance by generating the compressed second SIB instance by encoding each of any first parameters of the second SIB instance with a first format, said first parameters comprising those parameters in the second SIB instance that are identical to a corresponding parameter in the first SIB instance, and encoding each of any second parameters of the second SIB instance with a second format different from the first format, said second parameters comprising those parameters in the second SIB instance that are different than the corresponding parameter in the first SIB instance.

In one exemplary network node, the first format comprises a single bit, and the second format comprises a toggled version of the single bit in addition to the corresponding parameter.

In one exemplary network node, the first format comprises a single bit set, and the second format comprises a toggled version of the single bit in addition to a difference between the corresponding parameters in the first and second SIB instances.

In one exemplary network node, the network node is further configured to include a compression indicator in at least one of the first and second SIB instances, the compression indicator indicating whether at least one of the first and second SIB instances comprises compressed system information.

In one exemplary network node, the network node includes the compression indicator by including the compression indicator in a scheduling information element.

In one exemplary network node, the compression indicator further indicates the type of compression used to generate the compressed system information.

In one exemplary network node, at least one of the first and second downlink communication channels comprises a downlink broadcast channel, and the network node provides the first and second SIB instances by periodically broadcasting at least one of the first and second SIB instances in the serving cell via the corresponding downlink broadcast channel.

In one exemplary network node, the network node is further configured to receive a system information request from the wireless device, and the network node provides the first and second SIB instances by providing, via the corresponding downlink communication channel, at least one of the first and second SIB instances to the wireless device responsive to the received system information request.

In one exemplary network node, the network node provides the first and second SIB instances by periodically broadcasting the first SIB instance via the first downlink communication channel, said first downlink communication channel comprising a downlink broadcast channel, and providing the second SIB instance via the second downlink communication channel responsive to a system information request received from the wireless device.

In one exemplary network node, the network node divides the multi-cell content of the SIB by dividing the multi-cell content of the SIB into the first SIB instance comprising the SIB content for the serving cell, the second SIB instance comprising SIB content for a first grouping of second cells comprising two or more of the second cells, and a third SIB instance comprising SIB content for a second grouping of second cells comprising one or more of the second cells not in the first grouping of second cells, wherein the network node is further configured to provide the third SIB instance to the wireless device via a third downlink communication channel.

In one exemplary network node, the second and third downlink communication channels comprise the same downlink communication channel.

In one exemplary network node, the first grouping of second cells comprises two or more of the second cells that do not neighbor the serving cell, and wherein the second grouping of second cells comprises one or more of the second cells that neighbor the serving cell.

In one exemplary network node, the first grouping of second cells comprises two or more of the second cells that neighbor the serving cell, and wherein the second grouping of second cells comprises one or more of the second cells that do not neighbor the serving cell.

In one exemplary network node, the network node is further configured to compress the SIB content comprised within at least one of the first, second, and third SIB instances to generate at least one of a compressed first SIB instance, a compressed second SIB instance, and a compressed third SIB instance, the network node provides the first, second, and third SIB instances to the wireless device by providing each of the compressed instances to the wireless device via the corresponding downlink channel.

In one exemplary network node, the multi-cell content comprises the SIB content for all of the cells within the SI area.

One exemplary embodiment comprises a method, implemented by a wireless device in a serving cell, of determining system information for the serving cell and two or more second cells within a System Information (SI) area of the serving cell, where the wireless device is configured to receive downlink signals from a network node of the serving cell and to transmit uplink signals to the network node of the serving cell. The method comprises receiving a first SIB instance via a first downlink communication channel, said first SIB instance comprising SIB content for the serving cell, and receiving a second SIB instances via a second downlink communication channel, said second SIB instance comprising SIB content for two or more of the second cells. The method further comprises processing the first and second SIB instances to determine the SI for the serving cell and the two or more second cells.

One exemplary embodiment comprises a wireless device in a serving cell configured to determine system information for the serving cell and two or more second cells within a System Information (SI) area of the serving cell. The wireless device is configured to receive downlink signals from a network node of the serving cell and to transmit uplink signals to the network node of the serving cell. The wireless device comprises a receiver circuit/module and a SIB circuit/module. The receiver circuit/module is configured to receive a first SIB instance via a first downlink communication channel, said first SIB instance comprising SIB content for the serving cell, and to receive a second SIB instances via a second downlink communication channel, said second SIB instance comprising SIB content for two or more of the second cells. The SIB circuit/module/unit is configured to process the first and second SIB instances to determine the SI for the serving cell and the two or more second cells.

One exemplary embodiment comprises a wireless device in a serving cell configured to determine system information for the serving cell and two or more second cells within a System Information (SI) area of the serving cell. The wireless device is configured to receive downlink signals from a network node of the serving cell and to transmit uplink signals to the network node of the serving cell. The wireless device comprises a memory circuit and one or more processing circuits, the memory circuit containing instructions executable by the one or more processing circuits to configure the wireless device to receive a first SIB instance via a first downlink communication channel, said first SIB instance comprising SIB content for the serving cell, to receive a second SIB instances via a second downlink communication channel, said second SIB instance comprising SIB content for two or more of the second cells, and to process the first and second SIB instances to determine the SI for the serving cell and the two or more second cells.

One exemplary embodiment comprises a wireless device in a serving cell configured to determine system information for the serving cell and two or more second cells within a System Information (SI) area of the serving cell. The wireless device is configured to receive downlink signals from a network node of the serving cell and to transmit uplink signals to the network node of the serving cell. The wireless device is configured to receive a first SIB instance via a first downlink communication channel, said first SIB instance comprising SIB content for the serving cell, to receive a second SIB instances via a second downlink communication channel, said second SIB instance comprising SIB content for two or more of the second cells, and to process the first and second SIB instances to determine the SI for the serving cell and the two or more second cells.

DETAILED DESCRIPTION

Figure 1:
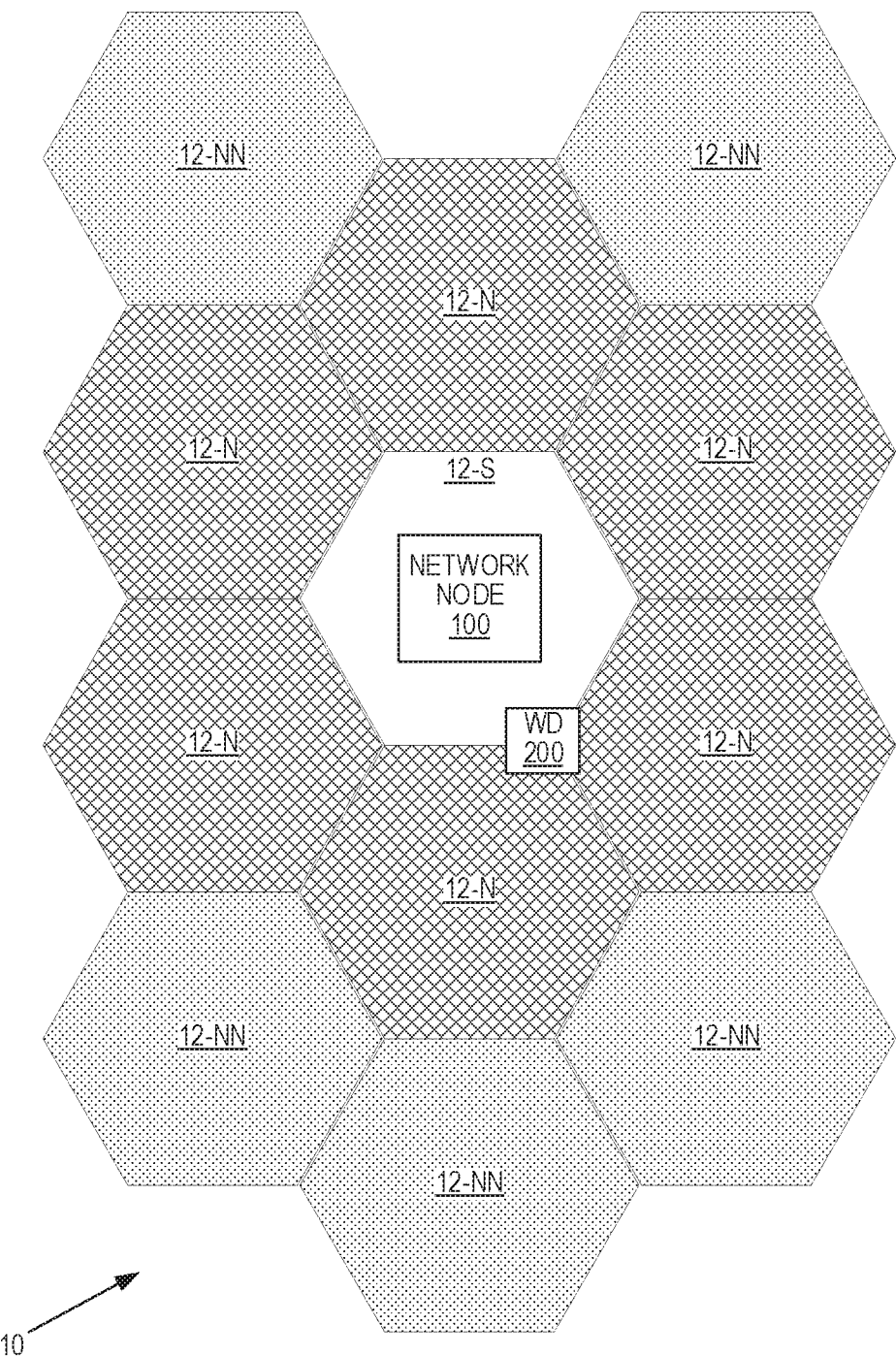
FIG. 1 shows an exemplary SI area comprising multiple cells, including the serving cell for a wireless device.

FIG. 1 shows an exemplary System Information (SI) area 10 of a multi-cell network comprising a plurality of cells, generically referred to as cells 12. In particular, the cells 12 in the SI area 10 comprise a serving cell 12-S, multiple neighboring cells 12-N, and multiple non-neighboring cells 12-NN. The serving cell 12-S includes at least one network node 100 serving a Wireless Device (WD) 200 located in the serving cell 12-S by providing system information to the wireless device 200. The neighboring cells 12-N are those cells in the SI area 10 adjacent to at least some portion of the serving cell 12-S, and may at least partially overlap the serving cell 12-S. The non-neighboring cells 12-NN are those cells in the SI area 10 that do not neighbor or overlap with any part of the serving cell 12-S. While FIG. 1 shows a plurality of cells in the SI area 10, it will be appreciated that an SI area 10 may have more or fewer cells, and in some instances, may comprise the serving cell 12-S and only one additional cell 12-N, 12-NN.

As used herein, network node 100 refers to equipment capable, configured, arranged, and/or operable to communicate directly or indirectly with a wireless device 200 and/or with other network nodes or equipment in the wireless network to enable and/or provide wireless access to the wireless device 200 and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs), and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node. More generally, however, network nodes may represent any suitable device (or group of devices) capable, configured, arranged, and/or operable to enable and/or provide a wireless device with access to the wireless network or to provide some service to a wireless device that has accessed the wireless network.

As used herein, wireless device 200 refers to a device capable, configured, arranged, and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For example, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As noted above, NR systems will divide the SI into "minimum SI" and "other SI," where the minimum SI comprises the SI needed for accessing the serving cell 12-S. The minimum SI is periodically broadcast in a cell, while the other SI may be either periodically broadcast or delivered on demand, e.g., triggered by a random access preamble (also referred to as Msg1) or a random access message 3 (also referred to as Msg3) from a wireless communication device 200 in RRC_IDLE or RRC_INACTIVE state or requested via Radio Resource Control (RRC) signaling from a wireless communication device 200 in RRC_CONNECTED state. If random access preamble (Msg1) transmissions are used, different preambles may be used to request different parts of the other SI, e.g., System Information Block(s) (SIB(s)) or groups of SIBs or SI message(s). If random access message 3 (Msg3) transmissions are used, a wireless communication device 200 may specify in the Msg3 which parts of the other SI, e.g., SIB(s) or groups of SIBs or SI message(s), the wireless communication device 200 wants the network to broadcast/transmit.

Figure 2:
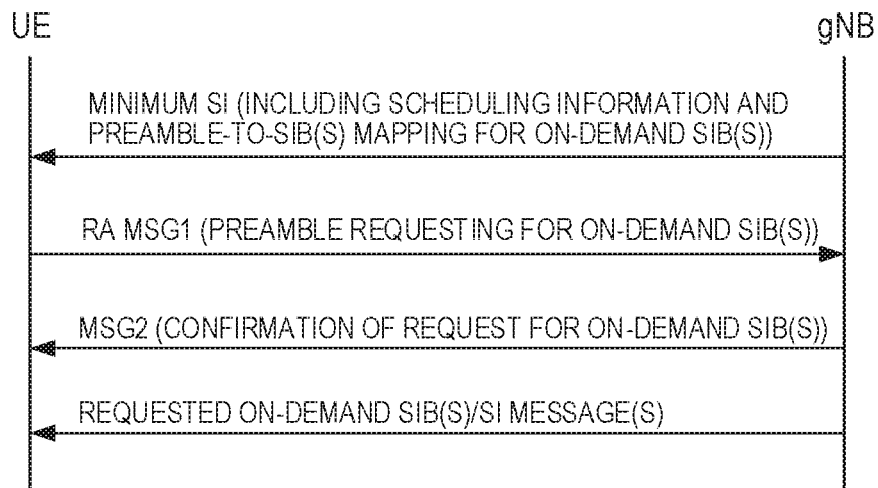
FIG. 2 shows one exemplary technique for providing SI to a wireless device.

FIG. 2 shows an exemplary Msg1 solution. With the Msg1 solution, reception of one of the concerned dedicated preambles triggers the network to broadcast the requested SIB(s) in accordance with scheduling information in the minimum SI. A network node, e.g., the gNB also transmits a Msg2 to the requesting wireless communication device 200, in response to the Msg1, confirming the successful reception of the Msg1 and confirming that the requested SI will be broadcast. As shown in FIG. 1, when a UE uses the Msg1 method for request of on-demand SI, the wireless communication device 200 selects the preamble associated with the desired on-demand SI (as specified in the minimum SI) and transmits this preamble to the network using PRACH resources. The wireless communication device 200 then awaits the confirming Msg2 (during a Msg2 window), and after receiving the confirming Msg2, the wireless communication device 200 monitors the downlink for the broadcast of the requested SI in accordance with the scheduling information for the requested SI, as indicated in the minimum SI.

Figure 3:
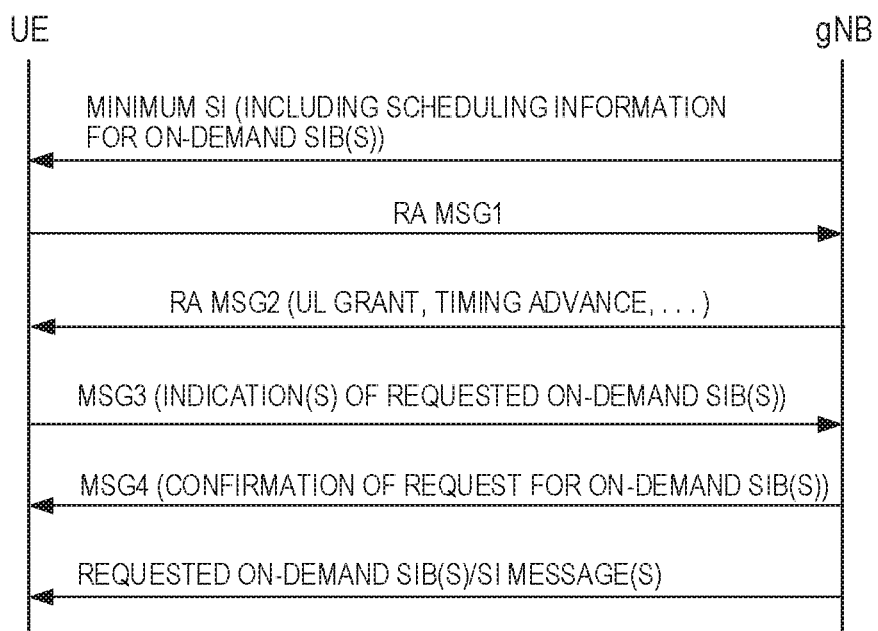
FIG. 3 shows another exemplary technique for providing SI to a wireless device.

FIG. 3 shows an exemplary Msg3 solution. With the Msg3 solution, the request procedure begins like a regular random access procedure: the UE transmits one of the regular (non-dedicated) preambles in Msg1 and receives a regular Msg2 in response, where the Msg2, as with any regular Msg2, allocates uplink transmission resources for transmission of Msg3, as well as provides a timing advance indication to enable the UE to transmit Msg3 with correct timing. The SI request included in Msg3 triggers the network to broadcast/transmit the parts of the other SI that are specified in the Msg3 from the UE in accordance with scheduling information in the minimum SI. A network node, e.g., the gNB, also transmits a Msg4 confirming the successful reception of the Msg3 and confirming that the requested SI will be broadcast. When a UE uses the Msg3 method for request of on-demand SI, it randomly selects one of the regular non-dedicated preambles (as specified in the minimum SI) and transmits this preamble to the network using PRACH resources. The UE then awaits Msg2 (during a Msg2 window) and after receiving the Msg2 the UE transmits Msg3 (using timing advance and uplink transmission resources as indicated in Msg2) and monitors the downlink for the confirming Msg4. After receiving the confirming Msg4, the UE monitors the downlink for the broadcast of the requested SI in accordance with the scheduling information for the requested SI, as indicated in the minimum SI.

The 3GPP agreements also accommodate multi-cell SI, where the SI provided in a cell may include SI that is valid in cells other than the cell in which the SI is provided, e.g., cells belonging to a certain SI area 10. Exemplary kinds of multi-cell SI include 1) a certain SI parameter value may be valid in multiple cells, and/or 2) multiple values for the same SI parameter, each being valid in a different cell. In addition, there may be optional SI parameters that are present in the SI of some of the cells but not in others.

It has also been decided to transmit a broadcast channel, denoted NR Physical Broadcast CHannel (NR-PBCH), following a periodic synchronization signal (comprising the two parts NR Primary Synchronization Signal (NR-PSS) and NR Secondary Synchronization Signal (NR-SSS) from which the Physical Cell Identity (PCI) can be derived). Together, the NR-PSS+NR-SSS+NR-PBCH form an entity denoted the Synchronization Signal (SS) Block. Some of the minimum SI will be broadcast on the NR-PBCH, e.g., denoted Master Information Block (MIB or NR-MIB), while the Remaining Minimum SI (RMSI) will be periodically broadcast on another channel, e.g., using an NR Physical Downlink Control CHannel/NR Physical Downlink Shared CHannel (NR-PDCCH/NR-PDSCH) structure. In this scenario, a scheduling allocation may be transmitted on the NR-PDCCH, which allocates transmission resources on the NR-PDSCH, where the actual RMSI is transmitted.

According to further agreements in 3GPP, information enabling a UE to receive the NR-PDCCH/NR-PDSCH carrying the RMSI should be transmitted on the NR-PBCH.

In some scenarios, it should be possible to use different transmission modes for the NR-PDCCH/NR-PDSCH carrying the RMSI, including e.g.:
6 Single Frequency Network (SFN) transmissions (from different TRPs of the same or different cells); 6 omnidirectional transmissions (with or without repetition);
    wide beam (e.g., sector-wide) transmissions (with or without repetition);
    a sweep of beams of another width (e.g., semi-wide) than the beams used for the SS Block transmissions; and
    a sweep of beams using the same beams as the ones used for the SS Block transmissions.

In the latter case, the RMSI transmissions may be described as being Quasi-Co-Located (QCL) with the SS Block transmissions, a consequence of which being that the NR-PSS/NR-SSS transmission can be relied on for accurate synchronization to be used when receiving the NR-PDCCH/NR-PDSCH carrying the RMSI. This is, however, not the case for the other transmission modes, either because different TRPs are used, or because different beamforming configurations are used, resulting in different propagation properties. Notably, the fact that the SI to be provided may be valid in multiple cells belonging to a certain SI area enables SFN transmission of this SI in the cells of the concerned SI area. However, recent developments in the NR work in 3GPP (in particular in the RAN2 working group), makes it less likely that multi-cell SFN transmission of the RMSI will be possible.

Figure 4:
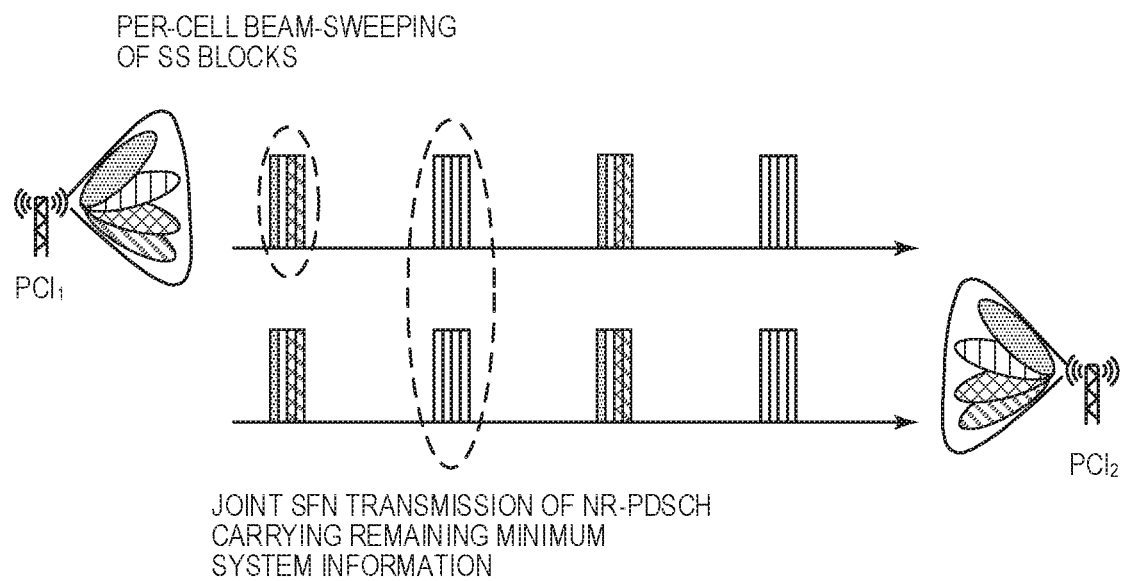
FIG. 4 shows an exemplary SFN transmission for providing minimum SI.

There are deployments where transmission of the SS Block(s) is unrelated to the beamforming of the NR-PDSCH containing the RMSI. For example, the SS Block may be beam swept using narrow and cell dependent beamforming, while the RMSI may be transmitted in wider beams per cell or jointly in wide beams using single frequency network transmission format, as shown in FIG. 4. In these cases, the SS block is not QCL with the DeModulation Reference Signal (DMRS) used for the NR-PDCCH/NR-PDSCH carrying the RMSI.

One way to provision SI for multiple cells in an SI area 10 is to include the SI of all of the cells covered by the multi-cell SI in each SIB, e.g., SIBx. In other words, SIBx contains a list of different SIBx content, where each SIBx content is each associated with a certain cell (the current cell or another cell in the same SI area). Because many parameter values will be the same in many or all of the cells, this technique allows efficient encoding of the multi-cell SI because such redundant data can be avoided, e.g., by encoding only differences between parameters of different cells. However, this technique is inflexible because the SI of some cells, e.g., current or serving cells, cannot be treated differently than the SI of other cells. This is a disadvantage because the SI of the current cell is generally more important to a UE as long as the UE is camping on these cells. For example, an operator may want to periodically broadcast the content of certain SIBs related to the current cell, while the corresponding SIB content for other cells could be made available on-demand. Alternatively or additionally, such differential treatment may be attractive in particular for SIB1, and parameters therein, because SIB1 is part of the minimum SI, and thus is mandatory to broadcast periodically in a cell and is broadcast with the shortest repetition period of all SIBs. Such differential treatment, however, is prohibited with this approach. This approach hence makes the minimum SI larger and thereby increases the unavoidable broadcast overhead, Another consequence is that the minimum SI is not really confined to the SI that is needed for accessing the cell, which was the original intention with the concept and the division of the SI into minimum SI and other SI.

Another way to provision SI for multiple cells in an SI area is to give the SIB content for each of the multiple cells its own SIB instance, where each SIB instance for this provisioning technique is only concerned with one of the cells. As used herein, a SIB instance is some portion of an SIB such that two instances of the same SIB contain the same types of parameters (although some optimal parameters may be present in one SIB instance but not in the other), but with potential different values. For this provisioning method, the parameter values contained in each particular SIB instance pertain only to a particular cell. This technique allows different provisioning methods for the SI of different cells. For example, the SIBx for the current cells may be periodically broadcast, but providing the SIBx for other cells may require on-demand request. While this technique allows for differential treatment of the SI content for different cells, this technique lacks the ability (and the advantages associated therewith) to compress the encoding, or otherwise reduce the size, of the multi-cell SI. As a result, the overall size of the multi-cell SI may become excessively large. Further, a UE may have to send multiple on-demand requests to retrieve a certain SIB, e.g., SIBx, or set of SIBs contained in the same SI message, for the multiple cells.

The solution presented herein provides multi-cell SI in a cell 12-S without increasing the size of the periodically broadcast parts and without requiring multiple on-demand requests to retrieve a certain SIB, or set of SIBs contained in the same SIB message, for the multiple cells, while still allowing compressed encoding of the multi-cell SI to keep the overall size of the multi-cell SI reasonably small. To that end, the solution presented herein divides the multi-cell SI content of a SIB into multiple instances, where each of the multiple SIB instances is provided via a corresponding downlink communication channel. With respect to the solution presented herein, a SIB instance refers to some portion of a SIB such that two instances of the same SIB contain the same types of parameters (although some optimal parameters may be present in one SIB instance but not in the other), but with potential different values. For the solution presented herein, the parameter values contained in each particular SIB instance may pertain to one certain cell or to multiple cells. When the SIB instance includes SIB content for multiple cells, each parameter in the SIB instance will include multiple parameter values, one parameter value for each cell covered by the SIB instance. As such, if two cells covered by the same SIB instance have the same value for a particular parameter, the network node 100 may use compression to reduce the size of the SIB instance, as discussed further below.

Figure 5:
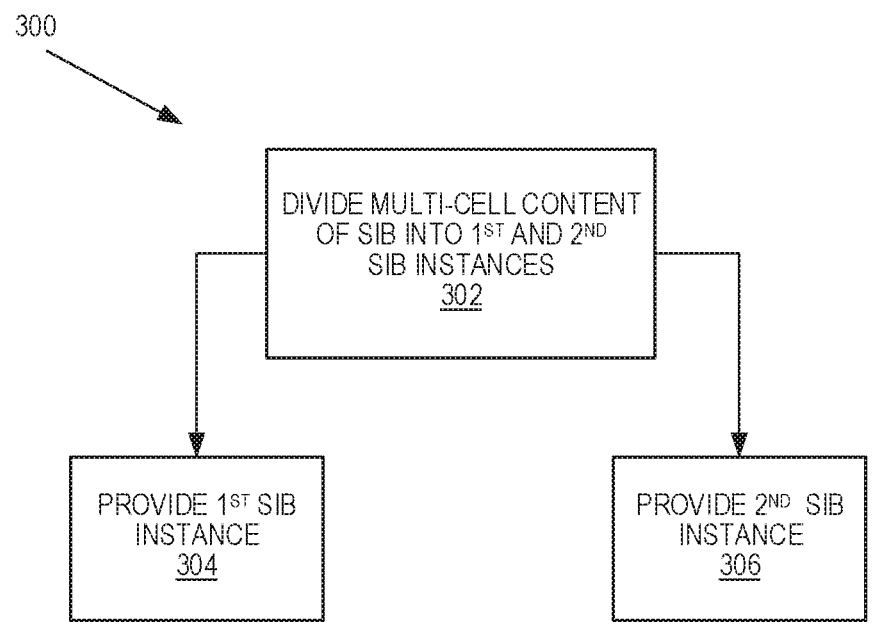
FIG. 5 shows one method for provisioning SI according to one exemplary embodiment.

FIG. 5 shows one exemplary method 300, implemented by a network node 100 of a serving cell 12-S, of provisioning system information for the serving cell 12-S and two or more second cells 12-N, 12-NN within an SI area 10. It will be appreciated that the provisioned information may, in some embodiments, comprise the SIB content for all of the cells within the SI area 10. The method 300 comprises dividing multi-cell content of the SIB into a first SIB instance and a second SIB instance (block 302). The first SIB instance comprises SIB content for the serving cell 12-S, and the second SIB instance comprises SIB content for two or more of the second cells 12-N, 12-NN, As such, each parameter in the second SIB instance includes one parameter value for each of the two or more second cells 12-N, 12-NN covered by the second SIB instance. Network node 100 provides the first SIB instance to the wireless device 200 via a first downlink communication channel (block 304), and provides the second SIB instance to the wireless device 200 via a second downlink communication channel (block 306).

Figure 6:
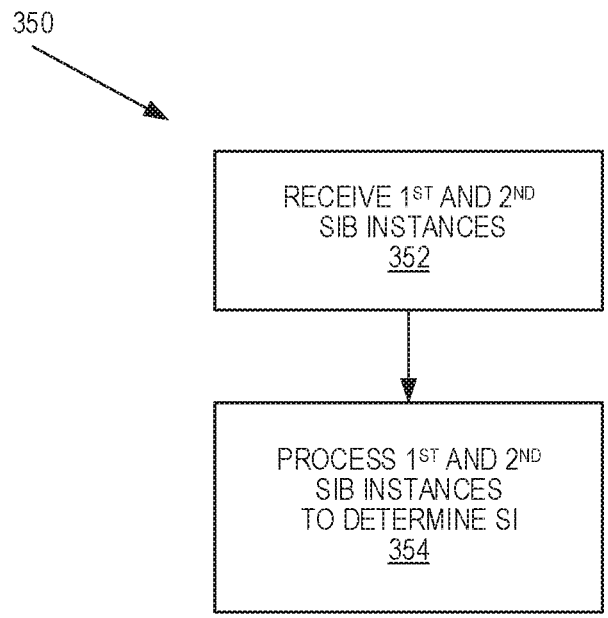
FIG. 6 shows one method for determining SI according to one exemplary embodiment.

FIG. 6 shows another exemplary method 350, implemented by wireless device 200 served by serving cell 12-S within an SI area 10 comprising the serving cell 12-S and two or more second cells 12-N, 12 NN. Method 350 comprises separately receiving a first SIB instance via a first downlink communication channel and a second SIB instance via a second downlink communication channel (block 352). The first SIB instance comprises SIB content for the serving cell 12-S and the second SIB instance comprises SIB content for two or more of the second cells 12-N, 12-NN. The wireless device 200 processes each received SIB instance to determine the SI for the serving cell 12-S and the second cells 12-N, 12-NN (block 354).

In both exemplary methods 300, 350, the network node 100 provides the first SIB instance to the wireless device 200 via a first downlink communication channel, and provides the second/compressed SIB instance to the wireless device 200 via a second downlink communication channel. In one embodiment, both the first and second downlink communication channels comprise downlink broadcast channels, which may comprise the same or different broadcast channels. In some embodiments, the network node 100 periodically broadcasts both the first and second SIB instances on first and second downlink broadcast channels, respectively. In other embodiments, the network node 100 periodically broadcasts the first SIB instance on a first downlink broadcast channel, and broadcasts the second SIB instance on a second downlink broadcast channel responsive to a request, e.g., a system information request, received from the wireless device 200. In still other embodiments, the network node 100 periodically broadcasts the second SIB instance on a second downlink broadcast channel, and broadcasts the first SIB instance on a first downlink broadcast channel responsive to a request, e.g., a system information request, received from the wireless device 200. In yet other embodiments, the network node 100 broadcasts the first and second SIB instances on the respective first and second downlink broadcast channels responsive to respective requests, e.g., system information request, received from the wireless device 200 for the respective SIB content. It will be appreciated that other downlink communication channels, e.g., dedicated downlink communication channels, may be used for either the first or second SIB instances.

The solution presented herein further facilitates a compression of at least one of the first and second SIB instances. As used herein, the compression—of a SIB instance refers to the reduction of the size of the SIB instance. In some embodiments, the network node 100 may compress the second SIB instance relative to the first SIB instance. In other embodiments, the network node 100 may compress the first SIB instance relative to the second SIB instance. It will also be appreciated that some compression may involve non-relative compression, also referred to as self-contained compression, where the compression of a SIB instance is relative to a previous version of that SIB instance, or where multiple occurrences of the same or similar data, e.g., bit strings, in the SIB instance are leveraged to reduce the number of bits that encodes the SIB instance, or removes duplicate data, etc. The network node 100 may achieve the desired compression using any number of compression techniques.

In one exemplary embodiment, which is optionally available for method 300, the network node 100 compresses the second SIB instance relative to the first SIB instance. For example, network node 100 may compare the SIB content of the second SIB instance to the SIB content of the first SIB instance to determine how/if the SIB content of the second SIB instance differs from the SIB content of the first SIB instance. The network node 100 then compresses the second SIB instance relative to the first SIB instance by including, in a compressed second SIB instance, only the SIB content of the second SIB instance that differs from the SIB content of the first SIB instance.

In another exemplary embodiment, network node 100 compresses the SIB content comprised within the second SIB instance by encoding each of any first parameters of the second SIB instance with a first format and encoding each of any second parameters of the second SIB instance with a second format different from the first format. In this embodiment, the first parameters comprise those parameters in the second SIB instance that are identical to a corresponding parameter in the first SIB instance, while the second parameters comprise those parameters in the second SIB instance that are different than the corresponding parameter in the first SIB instance. By using a different format for these two different types of parameters, the network node 100 can reduce the size of the second SIB instance. For example, the network node 100 may use a single bit that can be toggled, e.g., switched, between values to represent the different formats. For example, the network node 100 may use a first format comprising a single bit, e.g., 0, for the first parameters and may use a second format comprising a toggled version of the single bit, e.g., 1, for the second parameters. The network node 100 may then append a representation of the value of each second parameter to the toggled version of the single bit. For example, the network node 100 may add the value of the parameter, or a difference between the corresponding parameters, to the corresponding toggled bit. In any event, by using a single bit for each of the first parameters, the network node 100 compresses the second SIB instance relative to the first SIB instance, and thus reduces the size of the second SIB instance.

While the above discusses the compression of the second SIB instance relative to the first SIB instance, it will be appreciated that some embodiments may instead compress the first SIB instance relative to the second SIB instance. In yet other embodiments, both SIB instances may be compressed in some manner. For example, the first SIB instance may be compressed relative to a previously transmitted first SIB instance, and the second SIB instance may be compressed relative to the first SIB instance. In any event, when network node 100 compresses one or both of the first and second SIB instances, the network node 100 may include a compression indicator in either or both of the SIB instances provided to the wireless device 200, e.g., in a scheduling information element. Such a compression indicator may be used to inform the receiving wireless device 200 which of the provided SIB instances comprises compressed system information and/or the type of compression used.

While methods 300, 350 refer to the division of the multi-cell content into first and second SIB instances, it will be appreciated that the solution presented herein may be used to divide the multi-cell content into more than two SIB instances. For example, network node 100 may divide the multi-cell content of the SIB into a first SIB instance, a second SIB instance, and a third SIB instance. In one example, the first SIB instance comprises the SIB content for the serving cell 12-S, the second SIB instance comprises the SIB content for a first grouping of second cells comprising two or more of the second cells 12-N, 12-NN, and the third SIB instance comprises the SIB content for a second grouping of second cells comprising one or more of the second cells not in the first grouping of second cells 12-N, 12-NN. In this example, the network node 100 provides the third SIB instance to the wireless device 200 via a third downlink communication channel, which may or may not be the same as the second downlink communication channel. In one embodiment, the first grouping of second cells comprises two or more of the second cells 12-NN that do not neighbor the serving cell 12-S, the second grouping of second cells comprises one or more of the second cells 12-N that neighbor the serving cell 12-S. In another embodiment, the first grouping of second cells comprises two or more of the second cells 12-N that neighbor the serving cell 12-S, and the second grouping of second cells comprises one or more of the second cells 12-NN that do not neighbor the serving cell 12-S. As with the previously discussed embodiments, network node 100 may compress the first, second, and/or third SIB instances.

Figure 7:
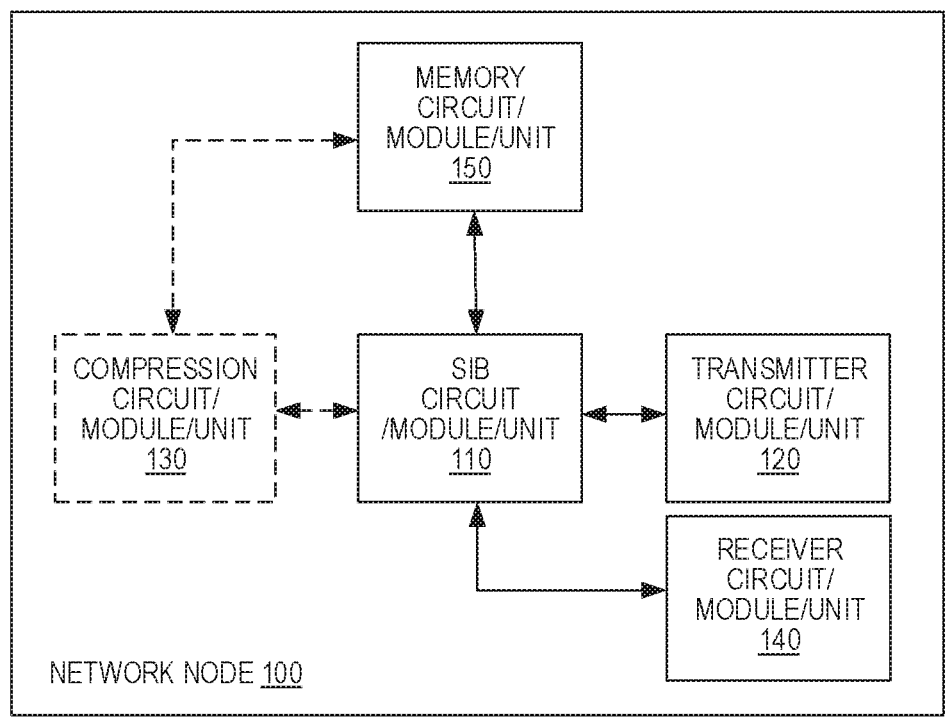
FIG. 7 shows a block diagram for a network node according to one exemplary embodiment.

FIG. 7 shows a block diagram for an exemplary network node 100 configured to implement method 300. As shown, network node 100 implements various functional circuits, means, units, or modules. These functional circuits, means, units, or modules, e.g., for implementing the method(s) herein, include, e.g., SIB circuit/module/unit 110, transmitter circuit/module/unit 120, receiver circuit/module/unit 140, memory circuit/module/unit 150, and optional compression circuit/module/unit 130. SIB circuit/module/unit 110 divides the multi-cell content of a SIB into the desired number of SIB instances (e.g., block 302 of method 300). When compression is desired, compression circuit/module/unit 130 compresses at least one of the SIB instances and provides the compressed SIB instance(s) to the SIB circuit/module/unit 110. SIB circuit/module/unit 110 forwards the SIB instances (and compressed SIB instances if applicable) to the transmitter circuit/module/unit 120, which provides each SIB instance to the wireless device 200 via the appropriate downlink communication channel. For example, the transmitter circuit/module/unit may provide each SIB instance to the wireless device 200 by providing the first SIB instance to the wireless device via the first downlink communication channel and providing the compressed second SIB instance to the wireless device via the second downlink communication channel, or providing the compressed first SIB instance to the wireless device via the first downlink communication channel and providing the (not compressed) second SIB instance to the wireless device via the second downlink communication channel, or providing the compressed first SIB instance to the wireless device via the first downlink communication channel and providing the compressed second SIB instance to the wireless device via the second downlink communication channel.

In some embodiments, SIB circuit/module/unit 110 generates and/or forwards the appropriate SIB instance(s) to the transmitter circuit/module/unit 120 responsive to a system information request received by the receiver circuit/module/unit 140. It will be appreciated that memory circuit/module/unit 150 stores any information and/or instructions required to implement the methods described herein, including but not limited to, compression instructions, SIB dividing instructions, past SIB instances, transmission control instructions, etc.

Figure 8:
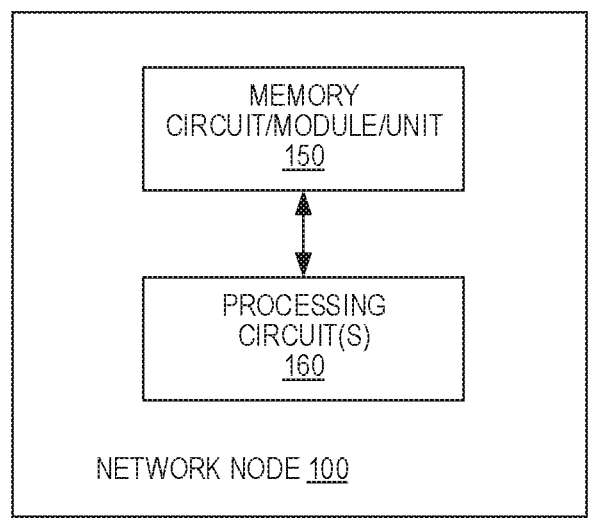
FIG. 8 shows another block diagram for a network node according to one exemplary embodiment.

FIG. 8 shows another exemplary network node 100 as implemented in accordance with one or more embodiments. As shown, network node 100 includes memory 150 and processing circuitry 160. While FIG. 8 does not explicitly show communication circuitry, which is configured to transmit and/or receive information to and/or from one or more wireless devices 200, e.g., via any communication technology, it will be appreciated that network node 100 includes such communication circuitry and/or the processing circuitry 160 encompasses such communication circuitry. The processing circuitry 160 is configured to perform processing described above, e.g., method 300, such as by executing instructions stored in memory circuit/module/unit 150, which may comprise any known storage medium. The processing circuitry 160 in this regard may implement certain functional means, units, or modules.

Those skilled in the art will also appreciate that embodiments herein further include corresponding computer programs, e.g., stored in memory circuit/module/unit 150 and executed in one or more processing circuits 160. A computer program comprises instructions which, when executed on at least one processing circuit 160 of the network node 100, cause the network node 100 to carry out any of the respective processing described above, e.g., method 300, A computer program in this regard may comprise one or more code modules corresponding to the means or units described above.

Embodiments further include a carrier containing such a computer program. This carrier may comprise one of an electronic signal, optical signal, radio signal, or computer readable storage medium. In this regard, embodiments herein also include a computer program product stored on a non-transitory computer readable (storage or recording) medium and comprising instructions that, when executed by processing circuit(s) 160 of network node 100, cause the network node 100 to perform as described herein.

Embodiments further include a computer program product comprising program code portions for performing the steps of any of the embodiments herein when the computer program product is executed by a computing device. This computer program product may be stored on a computer readable recording medium.

The above describes the solution presented herein in terms of the network node 100. It will be appreciated, however, that wireless device 200 is on the receiving end of the various network node embodiments disclosed herein, and thus is also involved in the solution presented herein. According to one exemplary embodiment, the wireless device 200 separately receives each SIB instance via the corresponding downlink communication channel, e.g., a first SIB instance comprising the SIB content for the serving cell 12-S via the first downlink communication channel and one or more additional SIB instances comprising the SIB content for some number of remaining cells 12-N, 12-NN via one or more additional downlink communication channels. It will be appreciated that wireless device 200 receives the SIB instances according to whatever protocol is implemented by the network node 100, e.g., periodically broadcast and/or in response to a system information request sent by the wireless device 200. The wireless device 200 then processes each received SIB instance to determine the multi-cell SIB content provided by the network node 100. It will be appreciated that all discussions herein regarding compression, downlink communication channels, etc., also inversely apply to the receiving end, e.g., to the wireless device 200.

Figure 9:
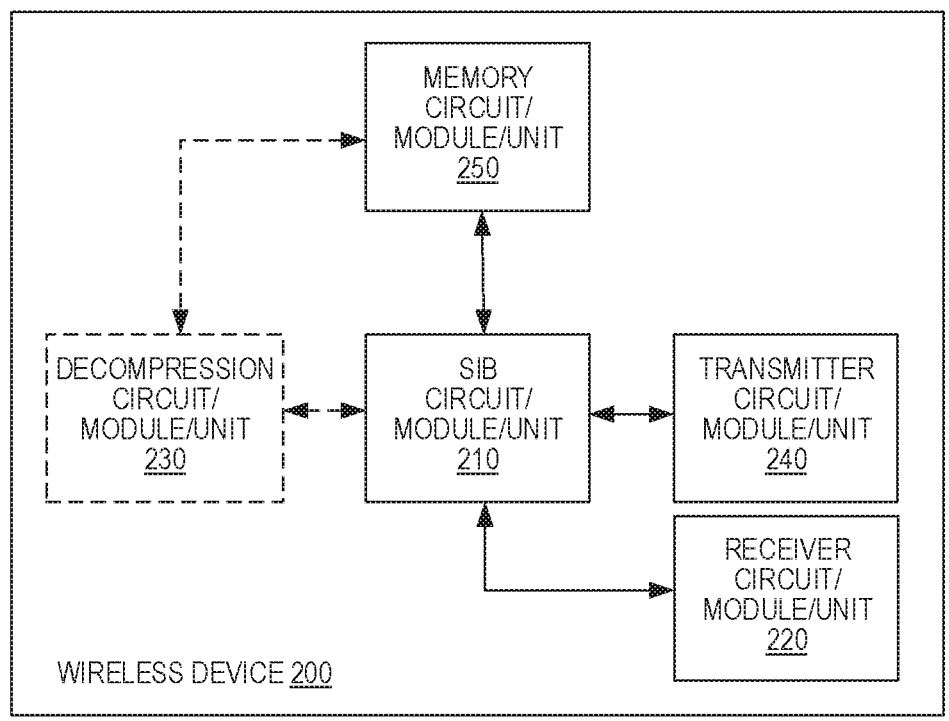
FIG. 9 shows a block diagram for a wireless device according to one exemplary embodiment.

FIG. 9 shows a block diagram of a wireless device 200 that determines SI information according to one exemplary embodiment, e.g., the method 350 of FIG. 6. In this embodiment, wireless device 200 comprises a SIB circuit/module/unit 210, receiver circuit/module/unit 220, transmitter circuit/module/unit 240, memory circuit/module/unit 250, and optional decompression circuit/module/unit 230. Receiver circuit/module/unit 220 receives each SIB instance via the corresponding downlink communication channel. SIB circuit/module/unit 210 processes each received SIB instance to extract the multi-cell SIB content. If any of the received SIB instances are compressed, e.g., as indicated by a compression indicator in a received system information element, the decompression circuit/module/unit 230 decompresses the compressed SIB instance, and provides the decompressed SIB instance to the SIB circuit/module/unit 210 for further processing. In some embodiments, transmitter circuit/module/unit 240 may send a system information request to the network node 100 to request one or more of the SIB instances.

Figure 10:
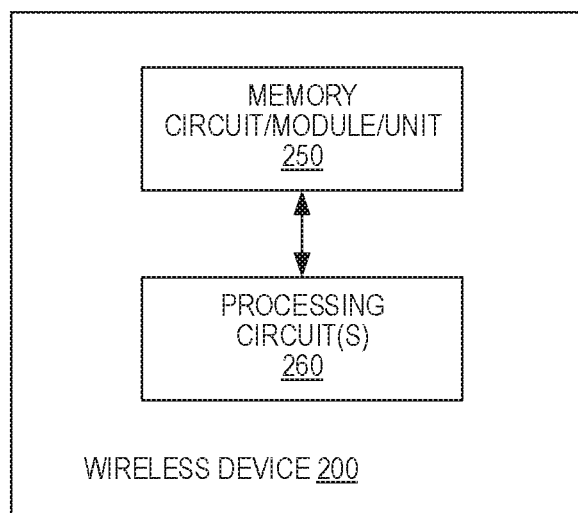
FIG. 10 shows a block diagram for another wireless device according to one exemplary embodiment.

FIG. 10 shows another exemplary wireless device 200 as implemented in accordance with one or more embodiments, e.g., the method 350 of FIG. 6. As shown, wireless device 200 includes memory circuit/module/unit 250 and processing circuitry 260. While FIG. 10 does not explicitly show communication circuitry, which is configured to transmit and/or receive information to and/or from the network node 100 of the serving cell 12-S, e.g., via any communication technology, it will be appreciated that wireless device 200 includes such communication circuitry and/or the processing circuitry 260 encompasses such communication circuitry. The processing circuitry 260 is configured to perform processing described above, such as by executing instructions stored in memory 250, which may comprise any known storage medium. The processing circuitry 260 in this regard may implement certain functional means, units, or modules.

Those skilled in the art will also appreciate that embodiments herein further include corresponding computer programs, e.g., stored in memory 250 and executed in one or more processing circuits 260. A computer program comprises instructions which, when executed on at least one processing circuit 260 of the wireless device 200, cause the wireless device 200 to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium. In this regard, embodiments herein also include a computer program product stored on a non-transitory computer readable (storage or recording) medium and comprising instructions that, when executed by processing circuit(s) 260 of wireless device 200, cause the wireless device 200 to perform as described herein.

The term circuit/module/unit may have conventional meaning in the field of electronics, electrical devices, and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The above generally describes various embodiments of the solution presented herein. The following provides more details for some example embodiments. It will be appreciated that such examples are intended to be illustrative and non-limiting.

The solution presented herein divides the multi-cell content of a certain SIB into at least two SIB instances, where the SIB content of the current (serving) cell 12-S is contained in one of the two SIB instances and the SIB content of at least some of the other cells 12-N, 12_NN in the SI area 10 is contained in the other SIB instance. The second SIB instance hence contains the SIB content of the other cells 12-N, 12-NN whose SI is provided in the current cell 12-S, e.g., the other cells 12-N, 12-NN of the same SI area 10 as the current cell 12-S.

For example, SIBx would be divided into SIBx-a, containing the SIBx content of the serving cell 12-S and SIBx-b containing the SIBx content of at least some of the other cells 12-N, 12-NN in the SI area 10, and in some cases, of all cells 12-N, 12-NN in the SI area 10. An example of how to utilize this division could be to configure SIBx-a to be periodically broadcast, while SIBx-b could be provided on-demand, e.g., in response to a system information request. For SIB1, this approach would mean that SIB1-a would be classified as minimum SI while SIB1-b would be classified as other SI. Note that for SIB1, SIB1-a would still preferably contain the information related to the provisioning of "other SI", e.g. in the SchedulingInfo IE.

If both SIBx-a and SIBx-b are periodically broadcast, or if both SIBx-a and SIBx-b are provisioned on demand, they could be scheduled/configured to belong to the same SI message. It would be clear from the SI, e.g., information in SIB1-a, e.g. in the SchedulingInfo IE, whether two SIBx instances (SIBx-a and SIBx-b) are used. Alternatively, or in addition, it could also be indicated in an IE in the SI message.

One exemplary embodiment comprises a self-contained encoding or encoding relative SIBx-a embodiment. When a SIB is divided into two SIB instances, e.g., SIBx is divided into SIBx-a and SIBx-b as described above, the parameters in SIBx-b may be encoded in relation to SIBx-a, in order to achieve compression by avoiding duplication of data that is common in multiple cells. However, it is also an option to make SIBx-b self-contained in the sense that it is possible to read its full content without having read SIBx-a. That is, according to this option, SIBx-b is not encoded in relation to SIBx-a. Note, however, that if SIBx-b contains SIB content of multiple (non-serving) cells, then compressed encoding avoiding data duplication is still possible within SIBx-b.

If both these encoding options are available, then an indicator, e.g., a single bit, in SIB1-a, e.g., in the SchedulingInfo IE (or another IE related to information about other SIBs and/or SIB instances), may be used to indicate whether SIBx-b is encoded in relation to SIBx-a or whether SIBx-b is self-contained. This information may also be indicated by an IE, e.g., a single bit, in SIBx-b itself or in the SI message carrying it.

On exemplary embodiment comprises relative encoding of SIBs. Relative encoding of one SIB (here denoted SIB-rel) using another SIB as a reference (SIB-ref) may be made, e.g., by encoding all parameters in SIB-rel that are identical to the corresponding parameter in SIB-ref with a single bit value, e.g., a "0" value, while parameters that differ may be encoded with "1+NEW_VALUE". In most cases this will result in a significantly more compact representation of SIB-rel than SIB-ref and more compact than SIB-rel would have been without the relative encoding.

However, in some rare occasions, e.g., where most of the parameter in SIB-ref and SIB-rel are different, using this kind of relative encoding could result in a larger representation than a straightforward absolute encoding would have required. For that reason, one may, e.g., add one bit at the beginning of SIB-rel indicating (with 0 or 1) if the encoding is relative or absolute. This alternative option guarantees that the encoding of SIB-rel is at most 1 bit larger than a straightforward absolute encoding would have been, while in most situations it will be significantly smaller.

In one of the solutions disclosed herein, each SIB is divided into two SIB instances. However, as an extension of the same principle, a SIB could be divided into more than two SIB instances. For example, the SIB content of "other cells" may be divided among multiple (could be any number) SIB instances. One reason to do this would be to enable different treatment of SIB instances (e.g., instances of SIBx) for different ones of the non-serving cells 12-N, 12-NN (within the same SI area 10). For example, one SIBx instance (e.g., SIBx-a) may contain the SIBx content of the serving cell 12-S (e.g., the current camping cell), another SIBx instance (e.g., SIBx-b) may contain the SIBx content of neighboring cells 12-N (within the same SI area 10), and a third SIBx instance (e.g., SIBx-c) may contain the SIBx content of non-neighboring cells 12-NN (still within the same SI area 10). With this division, e.g., the SIBx instance containing the SIBx content of the serving cell 12-S (e.g., SIBx-a) and the SIBx instance containing the SIBx content of the neighboring cells 12-N could be periodically broadcast, while the SIBx instance containing the SIBx content of non-neighboring cells 12-NN could be available on-demand. With this division into periodically broadcast and on-demand provision of SIBx content, an alternative may be to put the SIBx content of the serving cell 12-S and its neighboring cells 12-N within the same SIBx instance (e.g., SIBx-a) and the SIBx content of the non-neighboring cells 12-NN in another SIBx instance (e.g., SIBx-b). Other ways of dividing the SIBx content into more than two instances are also conceivable; in the extreme case, each cell 12-S, 12-N, 12-NN in the SI area 10 could have its own SIBx instance, where at least one of the SIB instances used compression.

When more than two SIB instances are involved, how to realize data compression (data duplication avoidance) through relative encoding becomes less straightforward? One option is that each SIB instance indicates the preceding SIB instance in the "instance chain" in relation to which the SIB instance is encoded. Another option is that the whole instance chain is indicated in the SchedulingInfo IE (or another IE related to information about other SIBs and/or SIB instances) in SIB1-a (or SIB1 if a single SIB1 instance is used). Another option is that each SIB instance is encoded in relation to the same "base instance", e.g., the SIB instance containing the SIB content for the current serving cell 12-S. Yet another option is that each SIB instance is self-contained (e.g., that its content is not encoded in relation to any other SIB instance).

The solution presented herein may generally be described as a method for flexible and resource-efficient provisioning of multi-cell system information (SI) in a current/serving cell, wherein the multi-cell content of a certain SIB is divided into multiple SIB instances, where the SIB content of the current/serving cell is contained in one of the SIB instances and the SIB content of the other cells is contained in the one or more other SIB instance(s).

In one embodiment, the multi-cell SI pertains to the same SI area.

In one embodiment, the cells to which the multi-cell SI pertains comprise all the cells of one SI area.

In one embodiment, the content of one or more of the SIB instances is compressed.

In one embodiment, the content is compressed using relative encoding in relation to the content of the SIB instance containing the SIB content pertaining to the current/serving cell.

In one embodiment, one or more parameter(s) in NR-SIB1 indicates whether relative encoding/compression is used for a certain SIB.

In one embodiment, the one or more parameter(s) is(are) part of the SchedulingInfo Information Element.

In one embodiment, each SIB instance (except the one containing the SIB content pertaining to the current/serving cell) contains one or more parameter(s) indicating whether relative encoding/compression is used to compress its content.

In one embodiment, the SIB instance containing the SIB content pertaining to the current/serving cell is periodically broadcast in the cell and the other SIB instance(s) is(are) provisioned via on-demand request.

The solution presented herein may, of course, be carried out in other ways than those specifically set forth herein without departing from essential characteristics of the solution. The present embodiments are to be considered in all respects as illustrative and not restrictive, and all changes coming within the meaning and equivalency range of the appended claims are intended to be embraced therein.

What is claimed is:

1. A method, implemented by a network node of a serving cell, of provisioning System Information (SI) for the serving cell and two or more second cells within an SI area of the serving cell, the network node configured to transmit downlink signals to a wireless device in the serving cell and to receive uplink signals from the wireless device, the method comprising:
   dividing multi-cell content of a System Information Block (SIB) into a first SIB instance comprising SIB content for the serving cell and a second SIB instance comprising SIB content for two or more of the second cells;
   compressing the SIB content comprised within the second SIB instance to generate a compressed second SIB instance by encoding each of any first parameters of the second SIB instance that are different than a corresponding parameter in the first SIB instance with a first format:
   providing the first SIB instance to the wireless device via a first downlink communication channel; and
   providing the compressed second SIB instance to the wireless device via a second downlink communication channel.

2. The method of claim 1 wherein:
   at least one of the first and second downlink communication channels comprises a downlink broadcast channel; and
   providing the first SIB instance and the compressed second SIB instance comprises periodically broadcasting at least one of the first SIB instance and the compressed second SIB instance in the serving cell via the corresponding downlink broadcast channel.

3. The method of claim 1:
   further comprising receiving a system information request from the wireless device;
   wherein providing the first SIB instance and the compressed second SIB instance comprises providing, via the corresponding downlink communication channel, at least one of the first SIB instance and the compressed second SIB instance to the wireless device responsive to the received system information request.

4. The method of claim 1 wherein dividing the multi-cell content of the SIB comprises dividing the multi-cell content of the SIB into:
   the first SIB instance comprising SIB content for the serving cell;
   the second SIB instance comprising SIB content for a first grouping of second cells comprising two or more of the second cells; and
   a third SIB instance comprising SIB content for a second grouping of second cells comprising one or more of the second cells not in the first grouping of second cells;
   the method further comprising providing the third SIB instance to the wireless device via a third downlink communication channel.

5. The method of claim 1:
   further comprising compressing the SIB content comprised within the first SIB instance to generate a compressed first SIB instance;
   wherein providing the first SIB instance to the wireless device comprises providing the compressed first SIB instance to the wireless device via the first downlink communication channel.

6. The method of claim 1 wherein compressing the SIB content comprised within the second SIB instance further comprises:
   encoding each of any second parameters of the second SIB instance with a second format different from the first format, said second parameters comprising those parameters in the second SIB instance that are identical to the corresponding parameter in the first SIB instance.

7. A non-transitory computer readable medium storing a computer program product for controlling a network node of a serving cell to provision System Information (SI) for the serving cell and two or more second cells within an SI area of the serving cell, the network node configured to transmit downlink signals to a wireless device and to receive uplink signals from the wireless device, the computer program product comprising software instructions which, when run on at least one processing circuit in the network node, causes the network node to:
   divide multi-cell content of a System Information Block (SIB) into a first SIB instance comprising SIB content for the serving cell and a second SIB instance comprising SIB content for two or more of the second cells;
   compress the SIB content comprised within the second SIB instance to generate a compressed second SIB instance by encoding each of any first parameters of the second SIB instance that are different than a corresponding parameter in the first SIB instance with a first format;
   provide the first SIB instance to the wireless device via a first downlink communication channel; and
   provide the compressed second SIB instance to the wireless device via a second downlink communication channel.

8. A network node of a serving cell for transmitting downlink signals to a wireless device in the serving cell and receiving uplink signals from the wireless device, the network node configured to provision System Information (SI) for the serving cell and two or more second cells within an SI area of the serving cell, the network node comprising:
   a System Information Block (SIB) circuit configured to divide multi-cell content of a SIB into a first SIB instance comprising SIB content for the serving cell and a second SIB instance comprising SIB content for two or more of the second cells;
   a compression circuit configured to compress the SIB content comprised within the second SIB instance to generate a compressed second SIB instance by encoding each of any first parameters of the second SIB instance that are different than a corresponding parameter in the first SIB instance with a first format; and a transmitter configured to:
   provide the first SIB instance to the wireless device via a first downlink communication channel; and
   provide the compressed second SIB instance to the wireless device via a second downlink communication channel.

9. The network node of claim 8 wherein:
at least one of the first and second downlink communication channels comprises a downlink broadcast channel; and
the transmitter provides the first SIB instance and the compressed second SIB instance by periodically broadcasting at least one of the first SIB instance and the compressed second SIB instance in the serving cell via the corresponding downlink broadcast channel.

10. The network node of claim 8:
further comprising a receiver configured to receive a system information request from the wireless device;
wherein the transmitter provides the first SIB instance and the compressed second SIB instance by providing, via the corresponding downlink communication channel, at least one of the first SIB instance and the compressed second SIB instance to the wireless device responsive to the received system information request.

11. The network node of claim 8:
wherein the compression circuit is further configured to compress the SIB content comprised within the first SIB instance to generate a compressed first SIB instance;
wherein the transmitter provides the first SIB instance to the wireless device by providing the compressed first SIB instance to the wireless device via the first downlink communication channel.

12. The network node of claim 8 wherein the compression circuit further compresses the SIB content comprised within the second SIB instance by:
   encoding each of any second parameters of the second SIB instance with a second format different from the first format, said second parameters comprising those parameters in the second SIB instance that are identical to the corresponding parameter in the first SIB instance.

13. A method, implemented by a wireless device in a serving cell, of determining System Information (SI) for the serving cell and two or more second cells within an SI area of the serving cell, where the wireless device is configured to receive downlink signals from a network node of the serving cell and to transmit uplink signals to the network node of the serving cell, the method comprising:
   receiving a first System Information Block (SIB) instance via a first downlink communication channel, said first SIB instance comprising SIB content for the serving cell;
   receiving a compressed second SIB instance via a second downlink communication channel, said compressed second SIB instance comprising SIB content for two or more of the second cells, wherein each of any first parameters of the compressed second SIB instance that are different than a corresponding parameter in the first SIB instance are encoded with a first format; and
   processing the first SIB instance and the compressed second SIB instance to determine the SI for the serving cell and the two or more of the second cells.

14. The method of claim 13:
further comprising transmitting a system information request to the network node;
wherein receiving the first SIB instance and the compressed second SIB instance comprises receiving, via the corresponding downlink communication channel, at least one of the first SIB instance and the compressed second SIB instance at the wireless device responsive to the transmitted system information request.

15. The method of claim 13:
further comprising receiving a third SIB instance via a third downlink communication channel;
wherein the first SIB instance comprises SIB content for the serving cell;
wherein the compressed second SIB instance comprising SIB content for a first grouping of second cells comprising two or more of the second cells; and
wherein the third SIB instance comprising SIB content for a second grouping of second cells comprising one or more of the second cells not in the first grouping of second cells.

16. The method of claim 13 wherein:
receiving the first SIB instance comprises receiving a compressed first SIB instance via the first downlink communication channel; and
processing the compressed first and second SIB instances comprises:
   decompressing the received compressed first SIB instance to generate a decompressed first SIB instance;
   decompressing the received compressed second SIB instance to generate a decompressed second SIB instance; and
   processing the decompressed first SIB instance and the decompressed second SIB instance to determine the SI for the serving cell and the two or more of the second cells.

17. The method of claim 13 wherein each of any second parameters of the compressed second SIB instance that are identical to a corresponding parameter in the first SIB instance are encoded with a second format different from the first format.

18. A non-transitory computer readable medium storing a computer program product for controlling a wireless device in a serving cell to determine System Information (SI) for the serving cell and two or more second cells within an SI area of the serving cell, the wireless device configured to receive downlink signals from a network node and to transmit uplink signals to the network node, the computer program product comprising software instructions which, when run on at least one processing circuit in the wireless device, causes the wireless device to:
   receive a first System Information Block (SIB) instance via a first downlink communication channel, said first SIB instance comprising SIB content for the serving cell;
   receive a compressed second SIB instance via a second downlink communication channel, said compressed second SIB instance comprising SIB content for two or more of the second cells, wherein each of any first parameters of the compressed second SIB instance that are different than a corresponding parameter in the first SIB instance are encoded with a first format; and
   process the first SIB instance and the compressed second SIB instance to determine the SI for the serving cell and the two or more of the second cells.

19. A wireless device in a serving cell configured to determine System Information (SI) for the serving cell and two or more second cells within an SI area of the serving cell, said wireless device configured to receive downlink signals from a network node of the serving cell and to transmit uplink signals to the network node of the serving cell, the wireless device comprising:
- a receiver circuit configured to receive:
  - a first System Information Block (SIB) instance via a first downlink communication channel, said first SIB instance comprising SIB content for the serving cell; and
  - a compressed second SIB instances via a second downlink communication channel, said compressed second SIB instance comprising SIB content for two or more of the second cells, wherein each of any first parameters of the compressed second SIB instance that are different than a corresponding parameter in the first SIB instance are encoded with a first format; and
- a SIB circuit configured to process the first SIB instance and the compressed second SIB instance to determine the SI for the serving cell and the two or more of the second cells.

20. The wireless device of claim 19 further comprising a transmitter circuit configured to transmit a system information request to the network node, wherein the receiver circuit receives the first SIB instance and the compressed second SIB instance by receiving, via the corresponding downlink communication channel, at least one of the first SIB instance and the compressed second SIB instance responsive to the transmitted system information request.

21. The wireless device of claim 19 wherein:
- the receiver circuit receives the first SIB instance by receiving a compressed first SIB instance via the first downlink communication channel; and
- the SIB circuit processes the compressed first and second SIB instances by:
  - decompressing the received compressed first SIB instance to generate a decompressed first SIB instance;
  - decompressing the received compressed second SIB instance to generate a decompressed second SIB instance; and
  - processing the decompressed first SIB instance and the decompressed second SIB instance to determine the SI for the serving cell and the two or more of the second cells.

22. The wireless device of claim 19 wherein each of any second parameters of the compressed second SIB instance that are identical to a corresponding parameter in the first SIB instance are encoded with a second format different from the first format.

* * * * *